Jan. 26, 1971 FUJIMARO IMAIZUMI ET AL 3,559,020
ELECTRIC MOTOR CONTROLLER DEVICE FOR ACCELERATION AND DECELERATION

Filed Aug. 8, 1969 — 6 Sheets-Sheet 1

| | | 33 | 37 | $C_{11}-C_{15}$ AND $C_{21}-C_{25}$ | | | | | | | | | | γ | 27 | 29 | 31 |
|---|---|---|---|---|---|---|---|---|---|---|---|---|---|---|---|---|---|
| | | | | 11 | 12 | 13 | 14 | 15 | 21 | 22 | 23 | 24 | 25 | | | | |
| OFF | | | | | | | | | | | | | | | | | |
| $S_1$ | | O | O | | | | | | | | | | | ▨ | O | | |
| $S_2$ | | O | O | O | | | | | | | | | | ▨ | O | | |
| $S_3$ | | O | O | O | | | | | | O | | | | ▨ | O | | |
| $S_4$ | | O | O | O | O | | | | | O | | | | ▨ | O | | |
| $S_5$ | | O | O | | O | | | | | O | O | | | ▨ | O | | |
| WF | | O | O | | O | | | | | | O | | | ▷ | O | | |
| $S_6$ | | O | O | | O | O | | | | | O | | | ◀ | O | | |
| WF | | O | O | | | O | | | | | O | | | ▷ | O | | |
| $S_7$ | | O | O | | | O | | | | O | O | | | ◀ | O | | |
| WF | | O | O | | | O | | | | | O | | | ▷ | O | | |
| | | O | O | | | O | | | | | O | | | | O | O | O |
| $P_1$ | | O | O | | | O | | | | | O | | | ◀ | | O | O |
| WF | | O | O | | | | | | | | | | | ▷ | | O | O |
| $P_2$ | | O | O | | | | O | | | | | O | | ◀ | | O | O |
| WF | | O | O | | | | O | | | | | O | | ▷ | | O | O |
| $P_3$ | | O | O | | | | O | O | | | | O | O | ◀ | | O | O |
| WF | | O | O | | | | | O | | | | | O | ▷ | | O | O |

▨ : HOLD γ AT $γ_1$
▷ : CONTROL γ FROM $γ_1$ TO $γ_2$
◀ : RETURN γ QUICKLY FROM $γ_2$ TO $γ_1$

INVENTORS
FUJIMARO IMAIZUMI, TSUTOMU OZAWA
and TAKASI TSUBOI

BY Craig, Antonelli, Stewart & Hill
ATTORNEYS

United States Patent Office 3,559,020
Patented Jan. 26, 1971

3,559,020
ELECTRIC MOTOR CONTROLLER DEVICE FOR ACCELERATION AND DECELERATION
Fujimaro Imaizumi, Tsutomu Ozawa, and Takasi Tsuboi, Katsuta-shi, Japan, assignors to Hitachi, Ltd., Tokyo, Japan, a corporation of Japan
Filed Aug. 8, 1969, Ser. No. 848,551
Claims priority, application Japan, Aug. 9, 1968, 43/56,134
Int. Cl. H02p 1/20
U.S. Cl. 318—405                    6 Claims

ABSTRACT OF THE DISCLOSURE

A motor controller device comprising a motor, impedance means for controlling the armature current of said motor, a plurality of contactor means sequentially closed to short-circuit said impedance means at each desired section thereof, field control means for controlling the field condition of said motor, and control means for operating after a predetermined number of said contactor means are closed, said field control means when each of the remaining contactor means is closed.

---

This invention relates to the speed control of motors, and more particularly to the controller device for the motors used with electric vehicles.

It is well known that the speed control of the main motors in D.C. electric vehicles is accomplished by varying the resistance value of the resistors connected in series with the motors to control the voltage applied to the motors. As the means for varying the resistance value of the resistors, use is usually made of a plurality of contactors provided so as to enable the resistors to be partially short-circuited. If these contactors are sequentially closed under a certain condition, the resistance value of the resistors is gradually decreased to thereby increase the voltage applied to the motors.

Accordingly the variation of the voltage applied to the motors does not occur continuously but in a stepped manner. This voltage variation involves a sharp variation in the armature current. If one of the contactors are closed at a stage of the motor speed, the resistance value of the resistors connected in series with the motors is decreased to thereby sharply increase the armature current as well as the voltage applied to the motors, with a result that the motors are further accelerated. At the same time the counter electromotive force of the motors is also increased and this causes the once increased armature current to be decreased again. When the armature current is decreased to a predetermined value, a subsequent contactor is closed and thereby the armature current is again increased to accelerate the motors.

If the predetermined value of the armature current is maintained constant, the motors on an average produce a substantially constant torque which provides the tractive effort of the vehicle, though the instantaneous value of the armature current varies.

However, the variation taking place in the tractive effort at the closing of each contactor is not desirable from the viewpoint of the adhesive performance of the vehicle, because the tractive effort of the vehicle may exceed the limit of adhesion determined by the axle weight and the coefficient of friction between the wheels and rails when the armature current is sharply increased. Such an excessive tractive force may cause the vehicle wheels to slip.

The sharp variation in the tractive effort is also undesirable from the viewpoint of riding quality because it imparts to the vehicle a shock which might make the passengers thereon feel uncertain or unpleasant.

For these reasons it is desirable to extremely minimize the variation of the armature current. For this purpose it has usually been the practice in the prior art to increase the number of the contactors provided to sequentially and partially short-circuit the resistors connected in series with the main motors so as to reduce the variation in the resistance value of the resistors when the contactors are closed.

This entirely holds true with the case of the dynamic brake.

During the dynamic braking, the power generated by the motors working as generators is consumed by the resistors. In this case also, the aforementioned resistors are sequentially short-circuited by the contactors to control the braking current or armature current. The variation taking place in the armature current when the contactors are closed causes the torque produced by the motors to be varied. This causes the variation in the braking force.

In order to reduce the variation in the braking force, it has also been required in the prior art to increase the number of the contactors so as to reduce the variation in the resistance value of the resistors when the contactors are closed.

In order that a satisfactory adhesive performance and riding quality may be obtained by the prior art means, it is necessary to provide a great number of contactors, which means a complicated construction and cumbersome maintenance or inspection of the controller device.

It is an object of the present invention to provide a motor controller device which uses a reduced number of contactors and is simple in construction as well as easy to maintain and inspect.

It is another object of the present invention to provide a motor controller device which eliminates various inconveniences resulting from the sharp variation in the tractive effort or braking force by minimizing the torque variation of the motors.

A feature of the present invention lies in that after a predetermined number of the contactors are closed, the field of the motors may be controlled between the full field and the weakest field whenever each of the subsequent contactors is closed.

Another feature of the present invention lies in that not only the field of the motors but also the armature current may be controlled to reduce the torque variation of the motors.

These and other objects and features of the present invention will become more apparent from the following description taken in conjunction with the accompanying drawings, in which:

Figure 1:
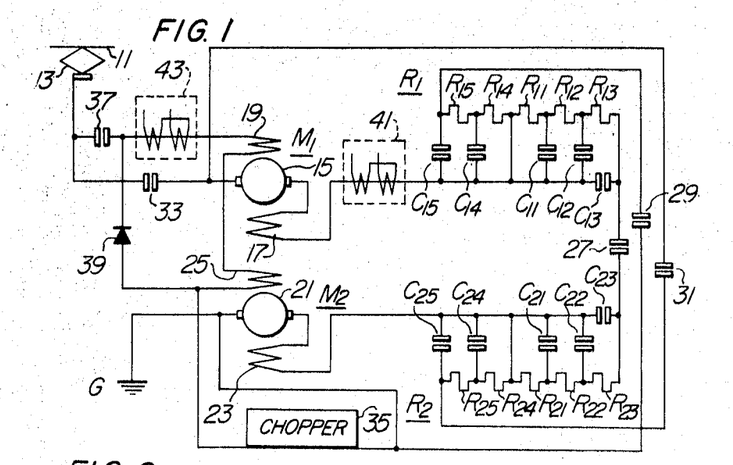
FIG. 1 is a block diagram showing the main circuit of the electric vehicle to which the present invention is applied.

Referring to FIG. 1, the motor circuit to which the present invention is applied will now be described.

Numeral 11 denotes a contact wire energized by a D.C. source and 13 a pantagraph for introducing power from the contact wire 11 to the electric vehicle. Main motors $M_1$ and $M_2$ form a compound motor which comprises armatures 15 and 21, series field windings 17 and 23 and shunt field windings 19 and 25. Such main motors $M_1$ and $M_2$ operate as a cumulative compound motor during the powering and as a differential compound generator during the braking. Resistors $R_1$ and $R_2$ are connected with the respective armature circuits. The resistors $R_1$ and $R_2$ are short-circuited at each small section $R_{11}$ to $R_{15}$ and $R_{21}$ to $R_{25}$ by groups of contactors $C_{11}$ to $C_{15}$ and $C_{21}$ to $C_{25}$ respectively.

Armatures 15 and 21, field windings 17 and 23 and resistors $R_1$ and $R_2$ are all connected together in series upon closing of a contactor 27. The series connection of armature 15, field winding 17 and resistor $R_1$ and the series connection of armature 21, field winding 23 and resistor $R_2$ are connected together in parallel upon closing of contactors 29 and 31, and opening of contactor 27.

The armature circuit thus switched over into series-parallel connection by the contactors 27, 29 and 31 is connected between the D.C. source and the ground G through the pantagraph 13 upon closing of a contactor 33.

The shunt field windings 19 and 25 are connected together in series, and a chopper 35 is further connected in series therewith. These series connections are connected between the D.C. source and the ground G through the pantagraph 13 upon closing of a contactor 37.

A fly-wheel diode 39 is connected in parallel with the series connection of shunt field windings 19 and 25.

As is well known, if the contactor 37 is closed to start the ON-OFF action of the chopper 35, the shunt field current flowing to the field windings 19 and 25 may be controlled.

The chopper 35 is a kind of switching circuit, and therefore, if the ratio of ON time $T_{on}$ to a cycle T of the ON-OFF action of the chopper is varied, the average value of the current flowing to the field windings 19 and 25 may be controlled. The aforementioned ratio will be hereinafter referred to as "ON time ratio" and represented by $\gamma$.

A control range is set for $\gamma$. The maximum value $\gamma$ max. represents the full field condition of the motors and the minimum value $\gamma$ min. represents the weakest field condition of the motors. Therefore, it is possible to obtain a full field operation if the vehicle is operated with $\gamma$ being maintained at $\gamma$ max. and to carry out the field weakening control just in the same way as in the prior art if $\gamma$ is controlled from $\gamma$ max. to $\gamma$ min.

If the main motors are series motors, the field control means is connected in parallel with the series field windings so that the current flowing to the series field windings is divided, and the field weakening control may be effected by controlling the ratio of division of the current.

In the armature circuit and field circuit there are inserted an $I_a$-detector 41 and an $I_f$-detector 43 for detecting the armature current $I_a$ and shunt field current $I_f$ respectively. Each of these detectors comprises an ordinary direct current transformer.

When the main motors $M_1$ and $M_2$ are brought into parallel connection, the $I_a$-detector 41 will detect the armature current of the main motor $M_1$ alone, but this results in no inconvenience for the reason to be described later.

Figure 3A:
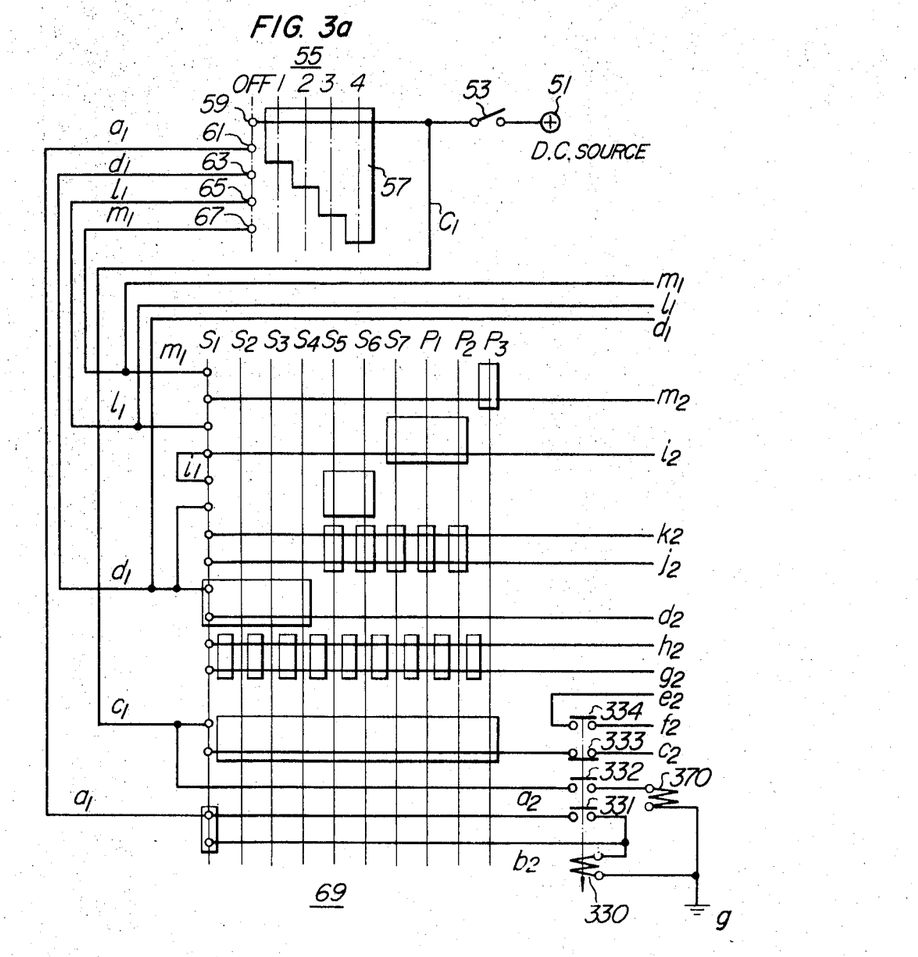
FIGS. 3a and 3b show, in block diagrams, an example of the controller device according to the present invention.
Figure 3B:
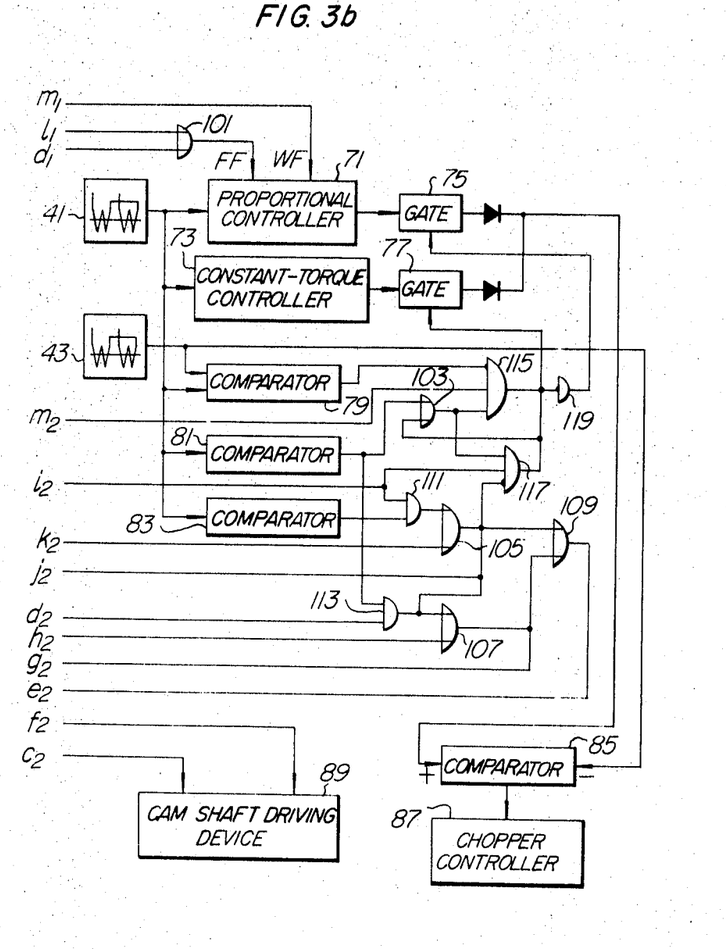

Referring to FIGS. 3a and 3b, description will be made of the control circuit according to an embodiment of the present invention. Numeral 51 denotes a D.C. control source and 53 a switch. Numeral 55 represents a master controller which comprises a contact segment and contacts 59, 61, 63, 65 and 67. The master controller 55 is operated by the operator to thereby govern the action of the main controller which will be described hereunder. Symbol OFF and numbers 1, 2, 3 and 4 represent the notch positions of the master controller 55.

Numeral 69 generally denotes a cam shaft controller which comprises a number of groups of contacts and a drum having contact segments of predetermined patterns studded therein. FIG. 3a shows a developed view of the cam shaft controller. The cam shaft controller 69 controls the position of a cam shaft directly connected to the drum. The cam shaft has a number of cams mounted thereon, and the rotation of these cams controls the closing, in a predetermined sequence, of the contactors $C_{11}$ to $C_{15}$ and $C_{21}$ to $C_{25}$ shown in FIG. 1. Therefore, the patterns of the segments shown in FIG. 3a correspond to the patterns of the cams mounted on the cam shaft.

Numeral 330 denotes an operating coil of the contractor 33, which has auxiliary contacts such as normally open contacts 331, 332 and 334 and a normally closed contact 333. Numeral 370 denotes an operating coil of the contactor 37.

Figure 4A:
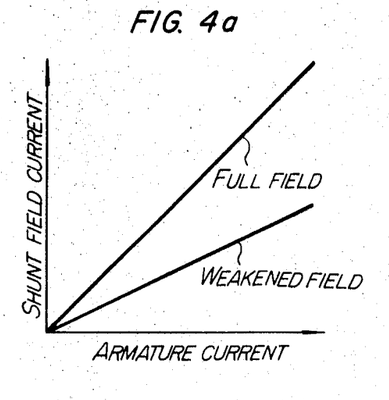
FIGS. 4a and 4b are graphs illustrating the characteristic of the control means used in the device of FIG. 3.

In FIG. 3b, a proportional controller 71 determines the shunt field current $I_f$ corresponding to the armature current $I_a$ in accordance with the output from the $I_a$-detector 41. The proportional controller 71 is provided with two switch-over characteristics as shown in FIG. 4a, one being for the full field control of main motors $M_1$ and $M_2$ and the other being for the field weakening control of the motors. These characteristics are selected in accordance with the command from the master controller 55.

Figure 4B:
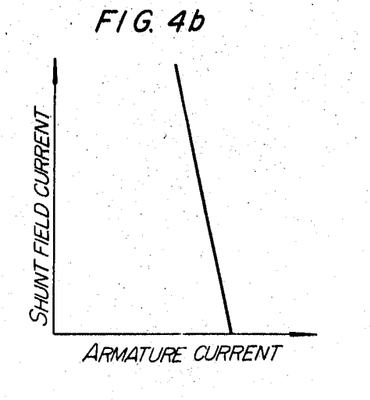

A constant-torque controller 73 having a characteristic as shown in FIG. 4b is provided to control the torque produced in the main motors $M_1$ and $M_2$ to a constant value.

Outputs from the proportional controller 71 and constant-torque controller 73 are introduced to gates 75 and 77 respectively.

A comparator 79 is provided to calculate the $I_f/I_a$ ratio, i.e. the ratio of the shunt field current $I_f$ to the armature current $I_a$, in accordance with outputs from $I_a$-detector 41 and $I_f$-detector 43 and to produce output if the ratio becomes lower than a predetermined value Fw. The said $I_f/I_a$ ratio and said predetermined value Fw will hereinafter be referred to as "field weakening ratio" and "weakest field ratio" respectively.

A comparator 81 produces output when the armature current $I_a$ becomes lower than a first predetermined value $I_1$, and a comparator 83 produces output when $I_a$ becomes higher than a second predetermined value $I_2$.

Another comparator 85 is provided to compare the reference value of the shunt field current $I_f$ for a value $I_a$ of the armature current with the actual value of $I_f$ from the $I_f$-detector 43 and provide the difference therebetween as its output. A chopper controller 87 determines the ON time ratio $\gamma$ of the chopper 35 in accordance with the aforementioned difference and thereby controls the chopper 35.

A cam shaft driving device 89 is provided which comprises a motor for driving the above-mentioned cam shaft and control means for controlling the start and stop and, if required, reversal, of the motor.

There are provided ordinary logical circuits indicated by logical symbols, that is, OR gates 101, 103, 105, 107 and 109, AND gates 111 and 113, INHIBIT gates 115 and 117 each having an inhibit terminal, and a NOT gate 119.

Figure 2:
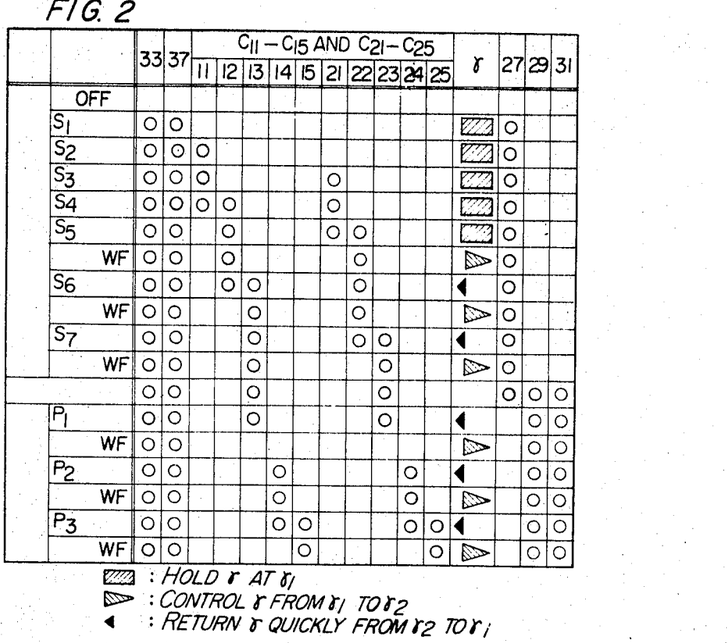
FIG. 2 is a chart showing the sequence of operation of the contactors in the main circuit of FIG. 1.

Referring to the chart of FIG. 2 showing the sequence of operation, description will now be made of the control operation of the above-described device embodying the present invention.

A switch 53 is first closed to connect the control circuit with the D.C. source 51. If the operator brings the master controller 55 into notch 1 position, the contacts 59 and 61 are closed by the segment 57 and thereby a line $a_1$ is connected with the source 51. Thus, the coil 330 is energized by the circuit of 51–53–59–61–line $a_1$-segment on cam shaft controller 69 (notch $S_1$)-line $b_2$-330-ground g, and the contactor 33 is closed. When the contactor 33 is closed, its normally open auxiliary contact 331 is also closed so that the contactor 33 self-holds by the circuit of the line $a_1$-segment on cam shaft controller 69-line $a_2$–331–330-ground g.

At the same time the contact 332 is closed so that the contactor 37 is also closed by the circuit of 51–53–line $c_1$–332–370–g.

Thus, the main circuit of FIG. 1 is now ready to start.

When the operator moves forward the master controller 55 to a notch 2, the contactor 27 is closed by another control circuit (not shown).

In the main circuit there is thus formed a series circuit of 11–13–33–15–17–$R_{11}$–$R_{12}$–$R_{13}$–27–$R_{23}$–$R_{22}$–$R_{21}$–23–21–G. At this time no counter electromotive force is present in the main motors $M_1$ and $M_2$, and therefore the armature current $I_a$ assumes a value determined by the sum of the resistance values of resistor sections $R_{11}$, $R_{12}$, $R_{13}$, $R_{23}$, $R_{22}$ and $R_{21}$. It is assumed that this value exceeds a predetermined value $I_1$.

Figure 5:
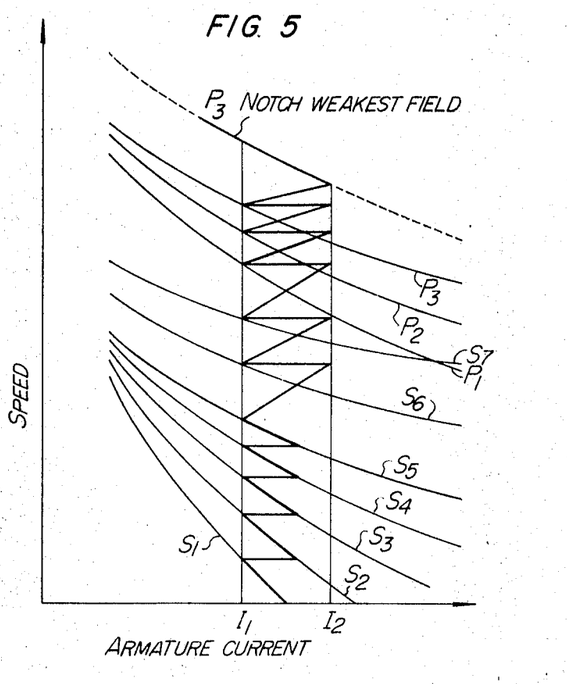
FIG. 5 is a graph showing the results when the main circuit of FIG. 1 is controlled by the device of FIGS. 3a and 3b.

Since the counter electromotive force is increased with the acceleration of the electric vehicle, the armature current $I_a$ is decreased along the notch $S_1$ curve as shown in FIG. 5. When the value of $I_a$ is decreased to $I_1$, the comparator 81 produces output, which provides an input of the AND gate 113.

A line $d_1$ is energized because the master controller 55 is in notch 2 position. This causes another input of the AND gate 113 to be provided by the circuit of line $d_1$-segment on cam shaft controller 69 (notch $S_1$)-line $d_2$.

These two inputs cause the AND gate 113 to produce output, which is imparted as a contactor closing signal to the cam shaft driving device 89 through the circuit of 107–109–line $e_2$–334–line $f_2$. Thereby the motor for driving the cam shaft is started to advance the cam shaft to the next notch $S_2$. Thus, the contactor $C_{11}$ is closed and the resistor section $R_{11}$ is short-circuited, and therefore the armature current $I_a$ is again increased to reach a value determined by the sum of the resistance values of the resistor sections $R_{12}$, $R_{13}$, $R_{23}$, $R_{22}$ and $R_{21}$. Thus the vehicle is further accelerated and the counter electromotive force is further increased. As a result, the armature current $I_a$ is decreased along the notch $S_2$ curve as shown in FIG. 5.

The armature current $I_a$ between notches $S_1$ and $S_2$ is $I_a > I_1$, and therefore the output of the comparator 81 disappears. However, the output of the AND gate 113 is maintained as it is by the circuit of 107–line $g_2$-segment on cam shaft controller 69 (between notch $S_1$ and $S_2$)-line $h_2$–107. As the result, the cam shaft can complete its advance from notch $S_1$ to notch $S_2$ because the contactor closing signal still remains in the circuit of 107–109–line $e_2$–334–line $f_2$. This self-holding of the contactor is released when the cam shaft has reached the notch $S_2$, because the circuit is then opened between the line $g_2$ and line $h_2$.

In the notch $S_2$ position, when the armature current $I_a$ is again decreased to $I_1$ for the same reason as mentioned above, the comparator 81 produces output, which in turn causes the AND gate 113 to produce output again. Thus, a contactor closing signal is again imparted to the cam shaft driving device 89 by the circuit of 107–109–line $e_2$–334–line $f_2$, whereby the cam shaft controller 69 is advanced to a notch $S_3$. Thereupon the cam on the cam shaft closes the contactor $C_{21}$ to short-circuit the resistor section $R_{21}$.

In this way the cam shaft controller 69 successively advances under the control of comparator 81 and the operation of the self-hold circuit of 107-line $g_2$-segment between notches on cam shaft controller 69-line $h_2$–107.

As shown in FIG. 2, the cam shaft controller closes the contactor $C_{12}$ when it reaches a notch $S_4$, and closes the contactor $C_{22}$ and opens the contactor $C_{11}$ when it reaches a notch $S_5$. The sequence of the closing and opening of these contactors is determined by the patterns of the cams mounted on the cam shaft.

The field control between notches $S_1$ and $S_5$ is effected in the manner as described hereunder. Between the notches $S_1$ and $S_5$, a signal FF for selecting the full field characteristic is imparted to the proportional controller 71 through the circuit of line $d_1$–101. As neither of INHIBIT gates 115 and 117 is producing an output, the NOT gate 119 produces output, so that the gate 75 is opened.

At this time the characteristic of the proportional controller 71 is such as shown in FIG. 4a. Therefore, a shunt field current $I_f$ of such a value that will maintain the main motors $M_1$ and $M_2$ in the full field condition for an armature current $I_a$ of any value is imparted as the reference value to the comparator 85. In accordance with the difference between this reference value and the output of the $I_f$-detector 43, the chopper controller 87 determines the ON time ratio $\gamma$ of the chopper 35, and thereby each notch between $S_1$ and $S_5$ is controlled at the full field.

When the notch $S_5$ is reached, the circuit is opened between lines $d_1$ and $d_2$ and thereby one of the inputs of the AND gate 113 disappears. As a result, the armature current $I_a$ is decreased to $I_1$ along the notch $S_5$ curve of FIG. 5, and no contactor closing signal is produced even if the comparator 81 produces output.

On the other hand, however, one of the inputs of the INHIBIT gate 117 is provided by the circuit of line $d_1$-segment on cam shaft controller 69 (notch $S_5$)-line $i_2$. Since the armature current $I_a$ has reached $I_1$ at the notch $S_5$, the comparator 81 is now producing output which is imparted as the other input of the INHIBIT gate 117 through the OR gate 103. Because of the absence of output in the comparator 83, the AND gate 111 produces no output and accordingly no inhibit signal is imparted to the inhibit terminal of the INHIBIT gate 117. As the result, output is produced in the INHIBIT gate 117 by said two inputs. This output provides input of the OR gate 103 and thereby the INHIBIT gate 117 self-holds until input is applied to its inhibit terminal. The output is further introduced to the gate 77 which is hereby opened. The output of the NOT gate 119 disappears because of the aforesaid output, and the gate 75 is closed.

The output of the constant-torque controller 73 is imparted as the reference value to the comparator 85 through the gate 77. At this time the output of the constant-torque controller 73 is of a value corresponding to a value of the shunt field current $I_f$ which will enable the main motors $M_1$ and $M_2$ to produce a constant torque in relation to the armature current $I_a$.

The difference between the reference value of $I_f$ and the output of the $I_f$-detector 43 is detected at the comparator 85. In accordance with the difference thus detected, the chopper controller 87 determines the ON time ratio $\gamma$ of the chopper 35.

Such a feedback control system accelerates the vehicle with a constant torque by controlling the shunt field current $I_f$, and thus the armature current $I_a$ is gradually increased with the acceleration of the vehicle. When the $I_a$ reaches $I_2$, the comparator 83 produces output.

$I_2$ is the value of the armature current $I_a$ when the main motors $M_1$ and $M_2$ are in the weakest field condition, and the torque then produced by the main motors must be selected such that it equals the torque when the main motors are in the full field condition and $I_a = I_1$.

The output of the comparator 83 causes the AND gate 111 to produce output, which is applied to the inhibit terminal of the INHIBIT gate 117 through the OR gate 105. As a result, the output of the INHIBIT gate 117 disappears to close the gate 77. Due to the disappearance of this output, the NOT gate 119 produces output to open the gate 75. The output of the proportional controller 71 is introduced to the comparator 85. By this time the characteristic of the proportional controller 71 has been selected to be the full field characteristic, so that the main motors $M_1$ and $M_2$ are immediately brought into the full field condition.

The output of the AND gate 111 self-holds by the circuit of 105-line $j_2$-segment on 69 (notch $S_5$)-line $k_2$–105 and is imparted as the contactor closing signal to the cam shaft driving device 89 through the circuit of 105–

109-line $e_2$–334-line $f_2$, and thereby the cam shaft controller 69 starts the advance.

When the cam shaft controller 69 comes between the notches $S_5$ and $S_6$, the circuit is opened between line $j_2$ and line $k_2$ and thereby the said self-hold circuit is opened. However, the output of the OR gate 105 self-holds by the circuit of 107-line $g_2$-segment on 69 (between notches $S_5$ and $S_6$)-line $h_2$–107. Therefore, the contactor closing signal continues to be imparted to the cam shaft driving device 89 and thereby the cam shaft controller 69 reaches the notch $S_6$. When the cam shaft controller 69 reaches the notch $S_6$, the self-hold circuit is also opened to thereby stop the advance of the cam shaft controller 69 to a further notch.

The arrival of the cam shaft controller 69 at the notch $S_6$ causes the contactor $C_{21}$ to be opened and the contactor $C_{13}$ to be closed. Thereby the resistor section $R_{13}$ is short-circuited. However, the armature current $I_a$ is decreased because the main motors $M_1$ and $M_2$ have been brought into the full field condition to increase the counter electromotive force. As the $I_a$ is decreased to $I_1$, the comparator 81 produces output, which is imparted to the INHIBIT gate 117 through the OR gate 103. Due to the other input applied to the INHIBIT gate 117 through the circuit of line $d_1$-segment on 69 (notch $S_6$)-line $i_1$-line $i_2$, the INHIBIT gate 117 produces output to open the gate 77 and thereby the field system is brought into the field weakening control condition. This is entirely the same as the control effected when the notch $S_5$ has been reached.

The cam shaft controller 69 moves forward from notch $S_6$ to notch $S_7$ just in the same manner as it did from notch $S_5$ to notch $S_6$, so as to close the contactor $C_{23}$ and short-circuit the resistor section $R_{23}$.

When the notch $S_7$ is reached, the circuit is opened between the line $d_1$ and line $i_1$ and thereby the line $i_2$ extinguishes the signal. As a result, neither field control command nor contactor closing signal is provided. Thus, the cam shaft controller 69 stops its advance to a further notch. Thereafter, the vehicle is accelerated along the notch $S_7$ curve as shown in FIG. 5 unless the master controller 55 is advanced to a further notch.

If the master controller 55 is advanced to a notch 3 by the operator, connection is provided between contacts 59 and 65 so that the line $l_1$ is energized. As a consequence, the line $i_2$ is again energized through the segment on the cam shaft controller 69 (notch $S_7$) so that input is provided to the INHIBIT gate 117. The output of the comparator 81 is applied as the other input to the INHIBIT gate 117 through the OR gate 103 so that the INHIBIT gate 117 produces output. There is no output present in the comparator 83 at this time, and therefore no output is produced by the AND gate 111 and no input is imparted to the inhibit terminal of the INHIBIT gate 117 through the OR gate 105.

The output of the INHIBIT gate 117 causes the gate 77 to open and thereby enters the field weakening control in the notch $S_7$. When the armature current $I_a$ reaches $I_2$, the comparator 83 produces output which causes the AND gate 111 to produce output which in turn is imparted to the inhibit terminal of the INHIBIT gate 117 through the OR gate 105. This causes the output of the INHIBIT gate 117 to disappear so as to close the gate 77 and open the gate 75. Accordingly, the field system of the main motors $M_1$ and $M_2$ are brought into the full field condition.

The output of the AND gate 111 is imparted as a contactor closing signal to the cam shaft driving device 89 through the circuit of 105–109-line $e_2$–334-line $f_2$. This causes the cam shaft controller 69 to advance to a notch $P_1$. The advance between the notches $S_7$ and $P_1$ is similar to that described above. When the cam shaft controller 69 reaches the notch $P_1$, the contactors 29 and 31 are closed by another control circuit (not shown) and the contactor 27 is opened. Thereafter the main motors $M_1$ and $M_2$ are connected in parallel. In one of the circuits constituting the parallel circuit are inserted resistor sections $R_{14}$ and $R_{15}$ of the resistor $R_1$, and the resistor sections $R_{24}$ and $R_{25}$ of the resistor $R_2$ are inserted in the other circuit.

In the notch $P_1$, just as in the case of the control in the notches $S_5$, $S_6$ and $S_7$, the field weakening control is effected when the armature current $I_a$ is decreased to $I_1$. When the weakest field is reached, thereby $I_a$ reaching $I_2$, the cam shaft controller 69 moves forward to a notch $P_2$. Upon arrival of the cam shaft controller 69 at the notch $P_2$, the contactors $C_{14}$ and $C_{24}$ are closed and the resistor sections $R_{14}$ and $R_{24}$ are short-circuited at the same time. In the notch $P_2$, the same control as in the notch $P_1$ is repeated so that when the armature $I_a$ reaches $I_2$, the contactors $C_{15}$ and $C_{25}$ are closed and the reistor sections $R_{15}$ and $R_{25}$ are short-circuited so as to advance the cam shaft controller 69 to the notch $P_3$.

When a notch $P_3$ is reached, the circuit is opened between the line $l_1$ and line $i_2$ so that output disappears both in the AND gate 111 and INHIBIT gate 117 to stop the advance of the cam shaft controller 69 to a further notch.

In this way, when the motor circuits are connected in parallel, the resistor sections $R_{14}$, $R_{24}$ and $R_{15}$, $R_{25}$ inserted in the respective circuits are short-circuited simultaneously with each other and the armature currents $I_a$ in the main motors $M_1$ and $M_2$ become substantially equal. Thus, the $I_a$-detector 41 may be inserted in one of the motor circuits to detect the armature current $I_a$.

If the master controller 55 is further advanced to a notch 4 by the operator, the contacts 59 and 67 are connected to energize the line $m_1$ and thereby input is imparted to the INHIBIT gate 115 through the circuit of line $m_1$-segment on 69 (notch $P_3$)-line $m_2$. Also, the fact that $I_a$ has reached $I_1$ causes the comparator 81 to produce output which provides the other input of the INHIBIT gate 115. No output is present in the comparator 79 at this time and therefore no input is applied to the inhibit terminal of the INHIBIT gate 115. Thus the INHIBIT gate 115 produces output which opens the gate 77 and closes the gate 75, whereby the main motors $M_1$ and $M_2$ are subjected to the field weakening control so as to provide a constant torque as described previously. Then, the field weakening ratio $I_f/I_a$ is detected by the outputs of $I_a$-detector 41 and $I_f$-detector 43. When the ratio $I_f/I_a$ becomes lower than the weakest field ratio $Fw$, the comparator 79 produces output to thereby cause the output of the INHIBIT gate 115 to disappear. The disappearance of this output causes the gate 77 to be closed and the gate 75 to be opened. At this time a signal WF for selecting the weakening field characteristic shown in FIG. 4a is imparted to the proportional controller 71 through the line $m_1$.

As the result, the vehicle is thereafter accelerated along the weakest field curved line at the notch $P_3$ as shown in FIG. 5.

In order that the vehicle may shift from acceleration to coasting, the operator may return the master controller 55 from the notch 4 to the OFF position. This causes all the lines except the line $c_1$ to be disconnected with the D.C. source 5. Consequently the coil 330 is demagnetized, and the contactor 33 and its normally open auxiliary contact 332 are opened so that the coil 370 is also demagnetized to open the contactor 37.

Further, the normally closed contact 333 is closed so that a notch back signal is imparted to the cam shaft driving device 89 through the circuit of 51–53-line $c_1$-segment on 69 (notch back)–333-line $c_2$.

This signal causes the cam shaft to be further rotated to reach the notch $S_1$ or to be reversely rotated to reach $S_1$. When the cam shaft reaches the notch $S_1$ the aforementioned circuit is opened to stop the cam shaft. Under this condition the vehicle continues its coasting.

As will be seen from FIG. 5, the above-described control enables the intervals between the notch curved lines to be greater. This is because the variation caused in the armature current $I_a$ by the closing of each contactor in each notch up to $S_5$ becomes the variation of the torque produced in the main motors $M_1$ and $M_2$ since the shunt field current $I_f$ is constant. Therefore, in order to reduce the variation, the intervals between the notch curved lines must be smaller. However, since the variation from $I_1$ to $I_2$ in the armature current $I_a$ in each notch after $S_5$ is in accordance with the field weakening control, the variation in the torque can be reduced as desired. Also, it can be controlled to a constant torque. In addition, it is possible to provide very great intervals between the notch curved lines if the field weakening ratio $I_f/I_a$ can be of a small value or if more or less torque variation is permissible.

A great interval between two adjacent notch curved lines means a great variation in the resistance value between the two notches. Therefore, if the series resistors of the main motors $M_1$ and $M_2$ may have a great variation in their resistance value, the number of contactors for successively short-circuiting these resistors may be greatly reduced.

Figure 6:
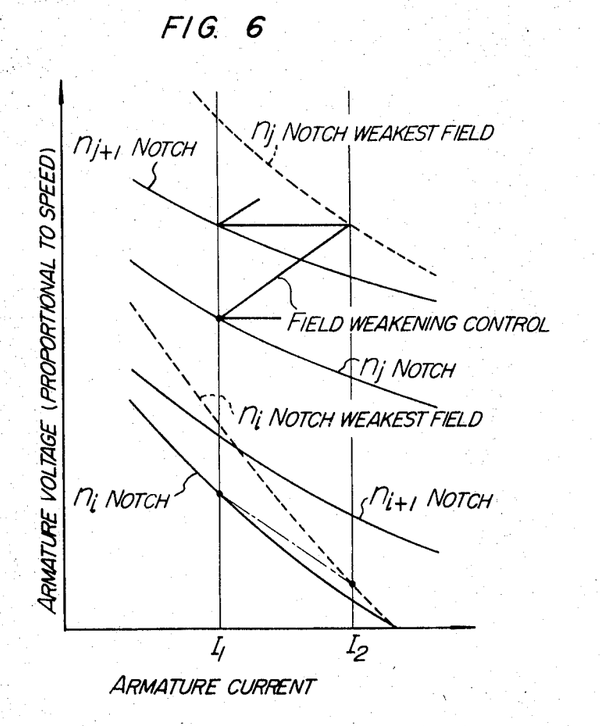
FIG. 6 is a graph for illustrating the control conditions.

As has been described above, however, the following conditions are required to effect the field weakening control while series resistors are connected with the main motors $M_1$ and $M_2$. These conditions will now be described with reference to FIG. 6. In the graph of FIG. 6, the ordinate represents the armature voltage, which is proportional to the speed of the vehicle, and thus FIG. 6 shows the same notch curved lines as FIG. 5.

If the field weakening control is effected, for example, in a notch $N_i$, the armature voltage will be decreased as shown by the dot-and-dash line. Of course the speed is also decreased.

The reason is that if the armature current $I_a$ is increased by the field weakening control, the great resistance value of the series resistors connected with the main motors in the notch $N_i$ causes the voltage drop in the series resistors to be also great enough to prevent sufficient voltage from being applied to the main motors.

However, if the field weakening control is effected in a notch $N_j$, the speed is increased with the increase of the armature current as shown by a thick straight line in the graph of FIG. 6. This is because the resistance value of the series resistors in the notch $N_j$ is sufficiently small.

These phenomena will now be examined from the viewpoint of the armature voltage. The notch $N_j$ is such a notch that the armature voltage in the weakest field condition in a notch is higher than the armature voltage in the full field condition in the next notch.

The present invention is also applicable to a dynamic brake as will be apparent from the following description. Although the main circuit used with a dynamic brake is not shown, it may be accomplished by changing the electrical connection of FIG. 1 so that the power generated by the main motors $M_1$ and $M_2$ may be consumed at the resistors $R_1$ and $R_2$. The main motors operate as a differential compound generator in this case.

Figure 7:
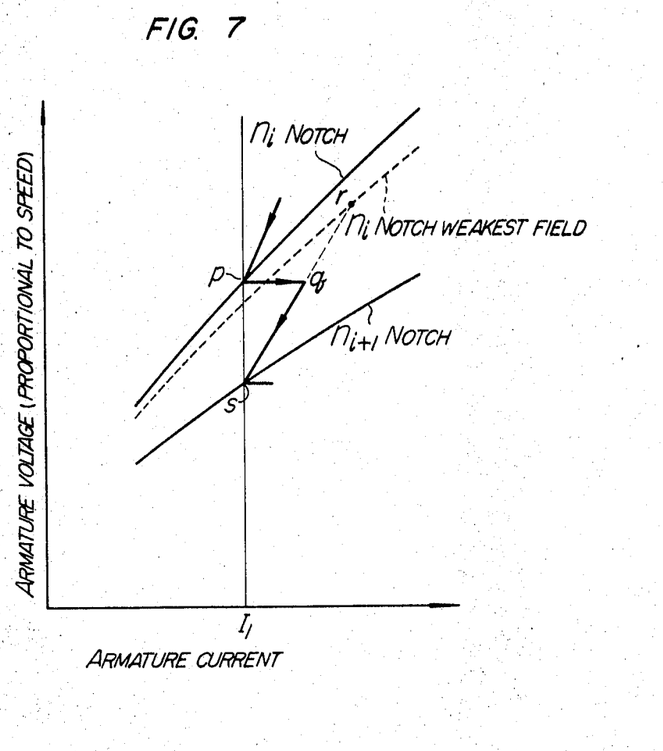
FIG. 7 is a graph for illustrating the principle of operation when the present invention is applied to the dynamic braking.

With reference to FIG. 7, description will now be made of the constant-torque control effected with such a main circuit.

In accordance with a commanded braking force, an armature current $I_a$ corresponding thereto is determined. It is now assumed that this armature current is $I_1$ and that a point P shown in FIG. 7 is reached as the result of the field weakening control effected in a certain notch. Then, one of the resistor sections is short-circuited to bring about the weakest field condition. At the moment the armature current is increased to a point $q$ due to the constant-torque control. The point $q$ is on a line combining a point S showing the armature voltage in the full field condition in the next notch $Ni+1$ and a point $r$ showing the armature voltage in the weakest field condition in the notch $N_i$. The said line is one which shows the constant torque, and no variation is caused in the torque even if the armature current $I_a$ is increased from point $p$ to point $q$.

If the field system is gradually intensified from point $q$ onward, the armature current will be decreased along the line $q$–$s$ with the decrease of the speed. When the field system reaches the full field, the armature current reaches the point $s$ and then shifts from the point $s$ to the notch $Ni+1$.

In this case the shunt field current is gradually decreased, whereas it is gradually increased in the case of powering. In spite of such a difference, however, the shift from one notch to another can be accomplished in the braking operation by the field weakening control just in the same way as in the powering operation.

In the dynamic braking, the resistance values of the resistors are usually selected in accordance with the speed at which the vehicle is running. In other words, the braking control is started from a notch corresponding to the current speed of the vehicle. Therefore, the application of the present invention to the braking is free from the limitation of notches which exists in the application of the invention to the powering.

What is claimed is:

1. A motor controller device comprising a motor, impedance means for controlling the armature current of said motor, a plurality of contactor means sequentially closed to short-circuit said impedance means at each desired section thereof, field control means for controlling the field condition of said motor, notch advancing means for sequentially closing said contactor means in accordance with the comparison between the actual value of said armature current and a first predetermined value of said armature current required for said motor to produce a commanded torque, and control means for alternately operating said field control means and said notch advancing means when said contactor means are sequentially closed so that the armature voltage in the weakest field condition at a second predetermined value greater than said first value becomes greater than the armature voltage in the full field condition at said first predetermined value of the armature current.

2. A motor controller device according to claim 1, wherein said control means has a constant-torque controller indicating the field current for always maintaining the torque produced by said motor at a commanded value for any armature current, said control means imparting output of said constant-torque controller as the reference value to said field control means when the actual value of the armature current reaches said first predetermined value, and also imparting a contactor closing signal to said notch advancing means when said actual value reaches said second predetermined value.

3. A motor controller device comprising a motor, impedance means for controlling the armature current of said motor, a plurality of contactor means sequentially closed to short-circuit said impedance means at each desired section thereof, field control means for controlling the field condition of said motor from the full field condition to the weakest field condition, notch advancing means for governing the closing of said contactor means, first comparator means responsive when the actual armature current is decreased to a first predetermined value required for said motor to produce a commanded torque in the full field condition, second comparator means responsive when the actual armature current exceeds a second predetermined value greater than said first predetermined value, and control means for operating said notch advancing means in accordance with the output of said first comparator means to close a first group of contactors comprising some of said contactor means and thereafter controlling the field condition from the full field condition to the weakest field condition through said field control means every time output is produced by said first comparator means, said control means quickly returning the field condition to the full field condition when output is produced by said second comparator means and closing a second group of contactors comprising the remaining contactor means through said notch advancing means.

4. A motor controller device according to claim 3, wherein the sections of said impedance means to be short-circuited by said second group of contactors have a greater value than the sections of said impedance means to be short-circuited by said first group of contactors.

5. A motor controller device according to claim 3, wherein said second predetermined value is the value of the armature current required for the motor in the weakest field condition to produce the torque commanded for said motor.

6. A motor controller device comprising a motor, impedance means for controlling the armature current of said motor, a plurality of contactor means sequentially closed to short-circuit said impedance means at each desired section thereof, field control means for controlling the field condition of said motor from the full field condition to the weakest field condition, notch advancing means for governing the closing of said contactor means, first comparator means responsive when the actual armature current is decreased to a first predetermined value required to produce a torque commanded by said motor in the full field condition, second comparator means responsive when the actual armature current exceeds a second predetermined value greater than said first predetermined value, and control means for operating said notch advancing means in accordance with the output of said first comparator means to close said contactor means and quickly returning the field condition from the full field condition to the weakest field condition through said field control means, said control means again controlling the field condition to the full field condition in accordance with the decrease of the armature current when output is produced by said second comparator means.

References Cited

UNITED STATES PATENTS

| | | | |
|---|---|---|---|
| 2,081,977 | 6/1937 | Bendz | 318—406X |
| 3,034,031 | 5/1962 | Lichtenfels | 318—406X |
| 3,067,372 | 12/1962 | Blanchard et al. | 318—395X |

ORIS L. RADER, Primary Examiner

R. J. HICKEY, Assistant Examiner

U.S. Cl. X.R.

318—422